Feb. 22, 1944. J. C. PLASTARAS Re. 22,443

TYPOGRAPHICAL COMPOSING MACHINE

Original Filed April 26, 1941 6 Sheets-Sheet 1

INVENTOR
James C. Plastaras
BY
Morrison, Kennedy & Campbell
ATTORNEYS

Feb. 22, 1944. J. C. PLASTARAS Re. 22,443

TYPOGRAPHICAL COMPOSING MACHINE

Original Filed April 26, 1941 6 Sheets-Sheet 2

James C. Plastaras INVENTOR

BY Morrison, Kennedy & Campbell

ATTORNEYS

TYPOGRAPHICAL COMPOSING MACHINE
Original Filed April 26, 1941 6 Sheets-Sheet 3
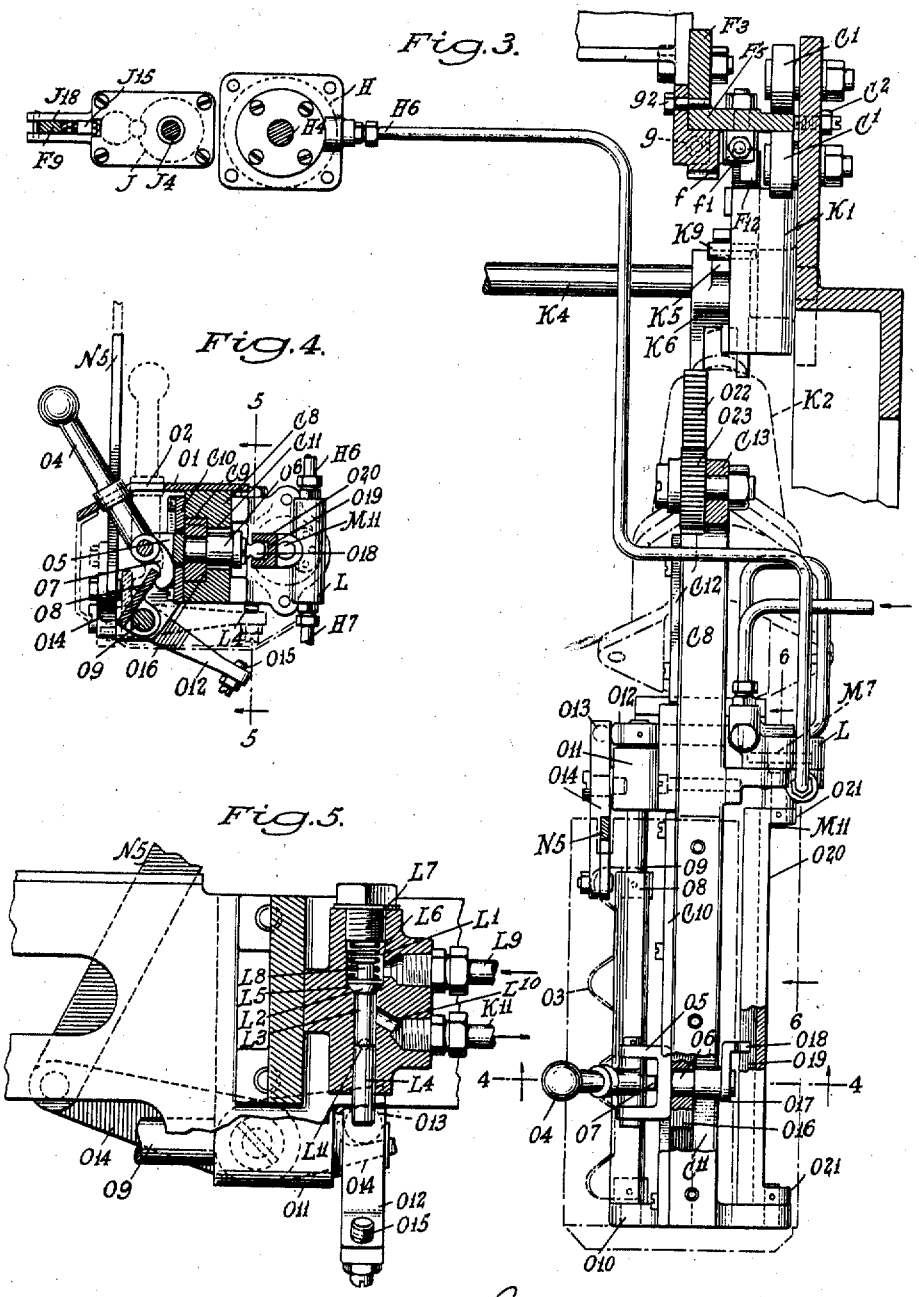
James C. Plastaras INVENTOR
BY
Morrison, Kennedy & Campbell.
ATTORNEYS Feb. 22, 1944. J. C. PLASTARAS Re. 22,443

TYPOGRAPHICAL COMPOSING MACHINE

Original Filed April 26, 1941 6 Sheets-Sheet 4

James C. Plastaras INVENTOR

BY Morrison, Kennedy & Campbell

ATTORNEYS

TYPOGRAPHICAL COMPOSING MACHINE

Original Filed April 26. 1941 6 Sheets-Sheet 5

INVENTOR
James C. Plastaras
BY
Morrison, Kennedy & Campbell
ATTORNEYS.

TYPOGRAPHICAL COMPOSING MACHINE
Original Filed April 26, 1941 6 Sheets-Sheet 6
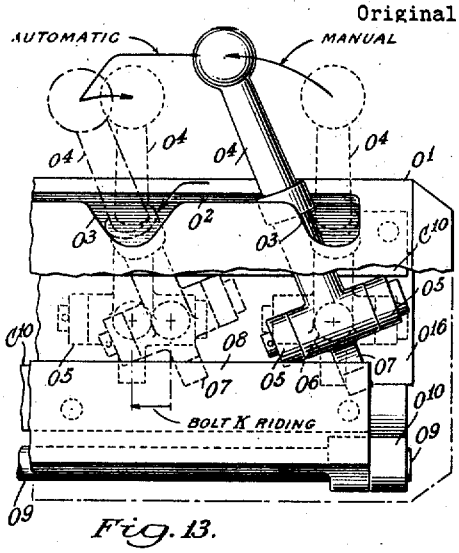
Fig. 13.
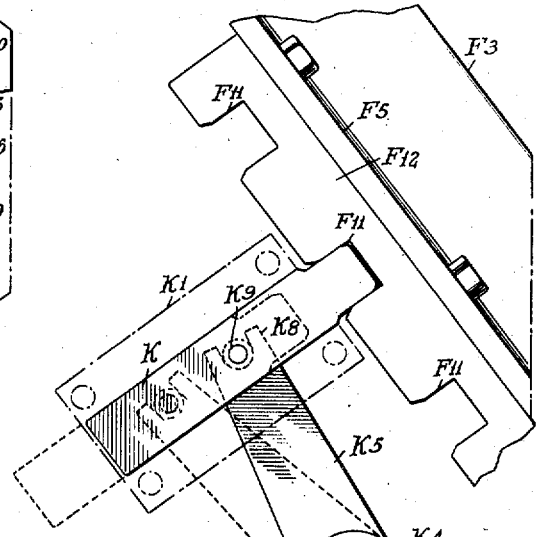
Fig. 12.
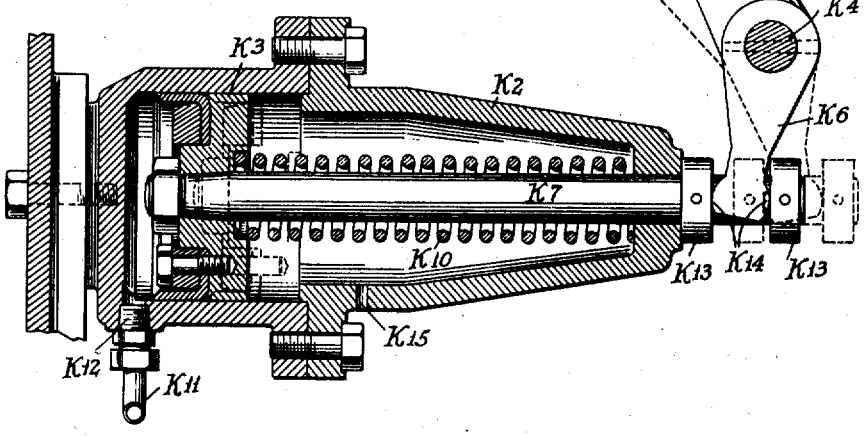
James C. Flastaras INVENTOR
BY
Morrison, Kennedy & Campbell
ATTORNEYS Reissued Feb. 22, 1944

Re. 22,443

UNITED STATES PATENT OFFICE 22,443

TYPOGRAPHICAL COMPOSING MACHINE

James C. Plastaras, Laurelton, N. Y., assignor to Mergenthaler Linotype Company, a corporation of New York Original No. 2,307,071, dated January 5, 1943, Serial No. 390,558, April 26, 1941. Application for reissue April 24, 1943, Serial No. 484,437

61 Claims. (Cl. 199—45)

This invention relates to typographical composing machines, such as "Linotype" machines of the general organization represented in Letters Patent of the United States No. 436,532 to O. Mergenthaler, wherein circulating matrices are released from a magazine in the order in which their characters are to appear in print and then assembled in line, the composed line transferred to the face of a mold, the mold filled with molten metal to form a slug or Linotype against the matrices which produce the type characters thereon, and the matrices thereafter elevated and returned through distributing mechanism to the magazine from which they started.

More particularly it relates to a power operated magazine shifting device and has its greatest utility where the machine is equipped with a plurality of magazines arranged to be moved upwardly and downwardly in the machine to bring one or another into operative relation with the assembling and distributing mechanisms. Various schemes have been suggested for raising and lowering the magazines by power, and, in one instance, the power has been supplied through an hydraulic arrangement comprising a cylinder and piston and wherein liquid under pressure is supplied to the cylinder below the piston to raise the magazines and the pressure on the liquid relieved so as to allow the effect of gravity to lower the magazines. Such a device, however, is slow or sluggish in operation, requires special relief expedients because of the incompressibility of the liquid to avoid damage to the parts should they encounter undue resistance in operation, and possesses many other disadvantages.

The present improvements consist in the provision of a pneumatically operated magazine shifting arrangement, employing as the operating medium compressed air or other suitable gas. The illustrated mechanism includes a cylinder and piston device connected between the magazine shift frame and the fixed machine frame, with provision for supplying air at both ends of the cylinder so that air pressure can be used to lower the magazines as well as to raise them. The weight of the magazines, as well as the associated parts that move with them, is counterbalanced, so that the same air pressure (which is relatively small) can be used to move the magazines in both directions, and furthermore, the speed of both operations can be made substantially the same.

A device for controlling the speed of the shifting operations is provided in the nature of a hydraulic cylinder and piston arrangement connected between the magazine shift frame and the fixed machine frame. The opposite ends of the cylinder are interconnected by a passageway so that liquid can flow from one end of the cylinder to the other, and a port is arranged in the passageway to control the speed of liquid flow. Thus, when the magazines are raised, the liquid will flow from one end of the cylinder through the port to the opposite end of the cylinder and, when the magazines are lower, the liquid will flow in the reverse direction, the size of the port controlling the rate of flow. Provision is also made in the mechanism for automatically slowing up the movement of the shift frame as any magazine thereof reaches its operative position, the purpose of this being to permit an automatic locking device which holds the selected magazine in its operative position, to operate smoothly and without objectionable shock to the mechanism.

Also, in accordance with the invention, the locking device just referred to is operated by air pressure. Thus, preparatory to shifting the magazines in either direction, air is supplied to a cylinder and piston arrangement which acts to withdraw the locking device to permit the magazines to be shifted; and, when a selected magazine approaches the operative position, the air pressure is released, permitting a spring to effect reengagement of the locking device with the magazine shift frame when said frame has reached the exact new position of adjustment.

The invention further contemplates a special control unit arranged at the front of the machine within easy reach of the operator and presenting a single handle by which the magazines and the automatic locking device are conjointly operated. In addition to those control functions, the handle will, in its initial movement, operate the usual feeler devices associated with the assembler entrance and with the distributing mechanism, for indicating whether or not the magazines are free to be shifted. Also, the handle will, by its position at any time, indicate which of the magazines is in operative position. Furthermore, if desired, there may be provided in each different position of the handle, a suitable recess to receive a marker or tag descriptive of the font of matrices contained in the corresponding magazine.

Referring to the drawings:

Fig. 3 is a sectional view taken on line 3—3 of Fig. 1;

Fig. 4 is a sectional view taken on line 4—4 of Fig. 3;

Fig. 5 is a sectional view taken on line 5—5 of Fig. 4;

Fig. 12 is a vertical sectional view taken in a fore-and-aft direction through the cylinder and piston arrangement controlling the magazine locking device; and Fig. 13 is a side elevation of a portion of the unit for controlling the magazine shifting device and illustrating different positions occupied by the handle during the substitution of one magazine for another.

Figure 1:
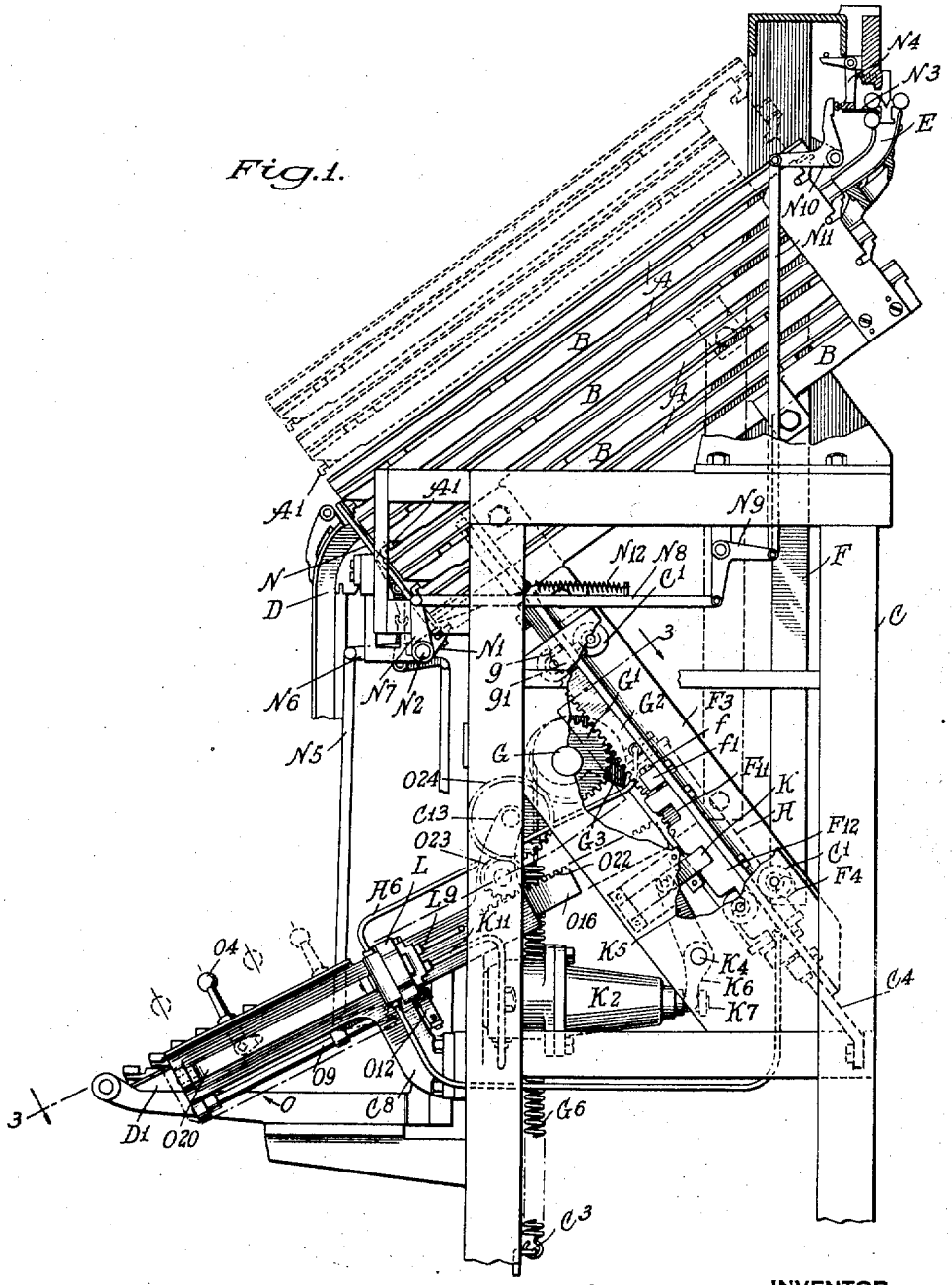
Fig. 1 is a side elevation of a portion of a typographical composing machine equipped with the present improvements.

The matrices are stored according to font in the superposed channeled magazines A, four of which are shown herein, but of which a greater or lesser number might be employed if desired. The several magazines are removably supported on separate base frames B conjointly constituting a shift frame which is arranged to be moved upwardly and downwardly in the fixed machine frame C to bring any selected magazine into operative relation with the assembler entrance D at the front and the distributing mechanism E at the rear. Each of the magazines A is provided with a series of matrix releasing escapements $A^1$ which, when the magazine is brought into operative position, are actuated under the control of the keyboard mechanism $D^1$ in the usual way.

In the instant machine, the lowermost magazine base frame, and consequently all of the superposed magazines which their respective base frames, are supported by a frame F consisting of a rear vertical member (see Figs. 1 and 2) formed with two laterally spaced angular shaped side members $F^1$ with an interconnecting crosspiece $F^2$ at the top, and consisting also of a front member arranged at an angle with respect to the rear member but perpendicular to the base frame. The front member, likewise, comprises two side members $F^3$ angular in cross-section and connected together by a cross frame braced for strength. The lowermost magazine base frame B is bolted to the rear members $F^1$ of the supporting frame at the top and is likewise bolted to the front members $F^3$ of the frame at the top, the rear and front frame members being bolted together at the bottom, as at $F^4$, where they intersect. A flange $F^5$, presented by each of the front frame members $F^3$, extends outwardly towards the adjacent fixed framework of the machine and engages between anti-friction rollers $C^1$, two pairs of the latter being provided at each side of the machine, one pair being located near the top of each flange $F^5$, and the other pair near the bottom thereof. The rollers $C^1$ are all mounted on studs fixed in the framework of the machine and consequently permit the shift frame to ride upwardly and downwardly with very little friction. The lateral adjustment of the shift frame is maintained by two adjustable set screws $C^2$, one at each side of the machine and threaded through the fixed machine frame, the screws engaging the outer edges of the side frame flanges $F^5$ previously referred to.

The whole magazine structure is counter-balanced in the machine and, for this purpose, there is provided a transverse shaft G (see Figs. 1 and 2) journalled at its opposite ends in the fixed framework of the machine. Pinions $G^1$, fixedly mounted one at each end of said transverse shaft, mesh with rack bars $G^2$ secured one to each of the side elements $F^3$ of the shift frame and facing toward the front. Also fixed on the transverse shaft is a pair of drums $G^3$, located one near each of the pinions $G^1$ and formed with a series of peripheral grooves $G^4$. The grooves act as guides for a series of straps $G^5$ which pass around the drums, the straps at one end being fastened to the drums and at their opposite ends being connected each to the upper end of an individual vertically arranged spring $G^6$ anchored at its lower end in a fixed cross member $C^3$ of the framework. There is one spring provided for each magazine with its supporting frame, and an additional spring for the remaining portions of the shift frame. The springs act as a unit to counterbalance the weight of the parts just referred to.

The arrangement is such that, if a magazine with its supporting frame is added or removed, a corresponding spring can likewise be added or removed, in order to maintain the balance at all times. Furthermore, in order to compensate for variations in force exerted by the springs, depending upon their degree of stretch, which in turn depends upon the location of the shift frame, the drums are spiral in form, presenting different effective radii at the points where the straps leave the drums, depending upon the degree of spring extension. Thus, looking at Fig. 1, when the shift frame F is lowered, the rack bars $G^2$ thereon, through the associated pinions $G^1$, will rotate the transverse shaft G in a clockwise direction so as to decrease the effective radius of the drums as the springs are extended, and, likewise, when the shift frame is raised, the transverse shaft G will rotate in a counterclockwise direction so as to increase the effective radius of the drums as the springs are contracted. In other words, the variations in force exerted by the springs, due to their expansion and contraction, are compensated by inversely varying radii at which the springs act so as to exert a torque on the shaft tending to balance the shift frame, which torque is substantially constant at all times.

The rack and gear arrangement further serves to prevent any sidewise tilting of the shift frame and, in order to insure a proper adjustment of the magazines with the assembler throat and the distributor, provision is made for a slight endwise adjustment of the rack bars with respect to the shift frame elements on which they are mounted. The means for effecting the adjustment comprise set screws $g$ threaded through lugs $g^1$ located one above and one below each rack bar and mounted on the frame elements $F^5$. The adjustment is effected by loosening screws $g^2$ which hold the bars on the frame, backing off one set screw, taking up on the other, and then tightening the holding screws.

Figure 2:
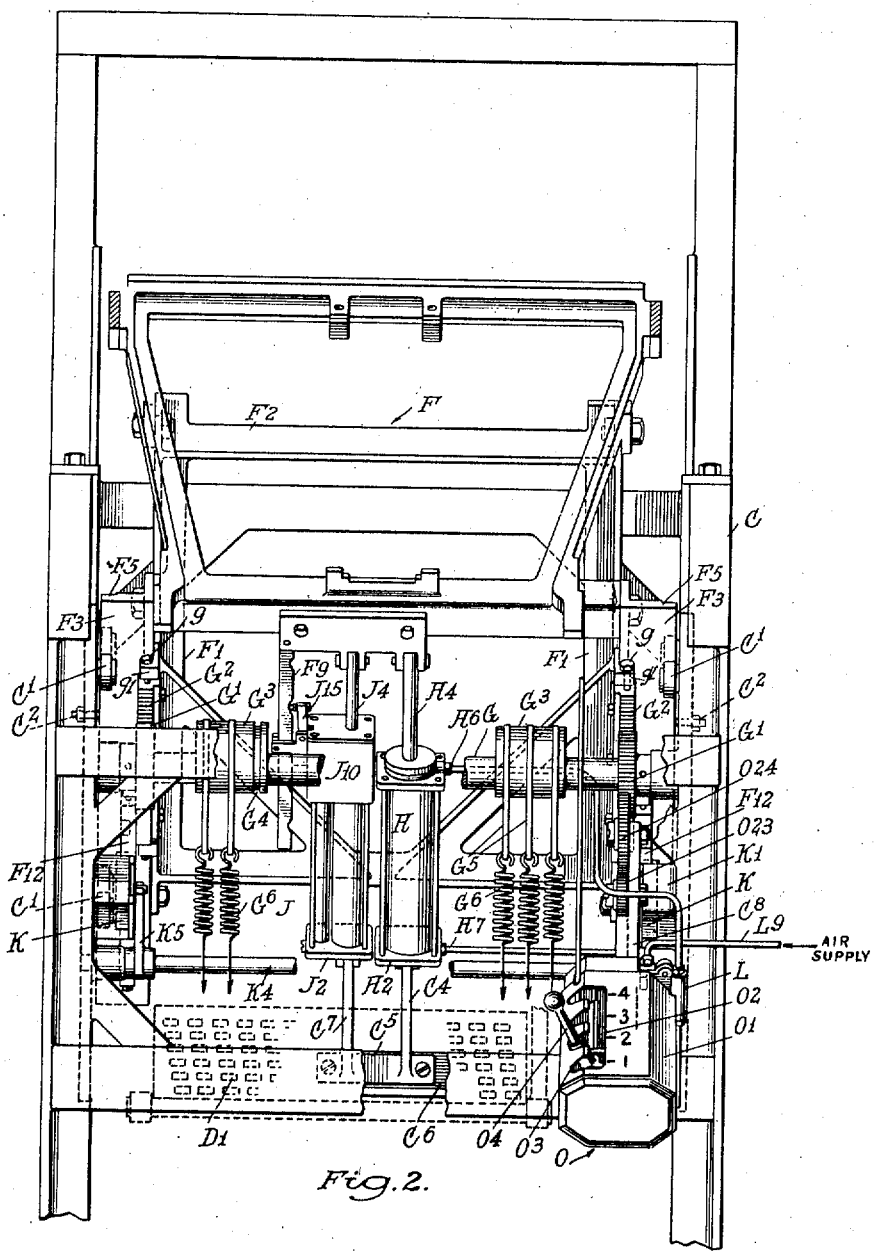
Fig. 2 is a front elevation of that portion of the machine illustrated in Fig. 1, but with the magazines, assembler entrance, and distributor removed so as better to illustrate the details of the improved device.
Figure 10:
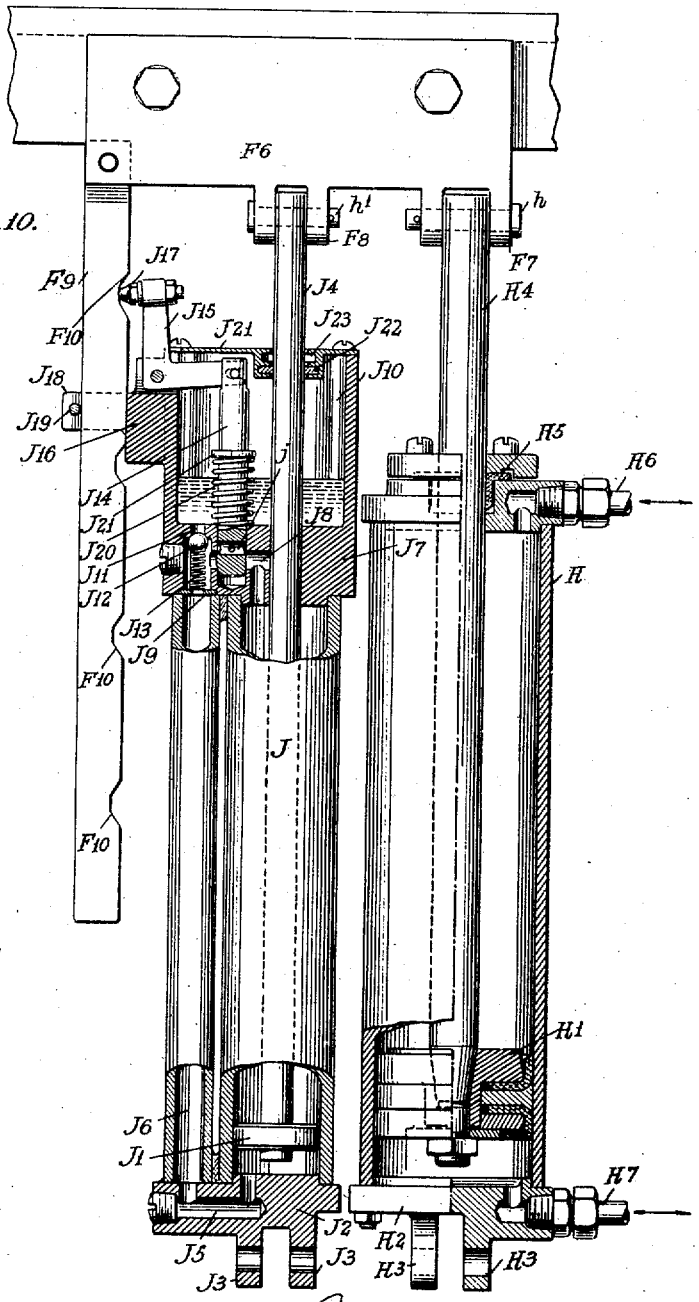
Fig. 10 is a front elevation, partly in section, of the cylinder and piston arrangement by which the shift frame is moved and of the hydraulic cylinder and piston arrangement by which the speed of the shifting movement is controlled.

The magazine shift frame is raised and lowered by means of a pneumatically operated mechanism comprising a cylinder H and piston $H^1$, connected between the shift frame and the fixed frame of the machine (see Figs. 1, 2 and 10). The cylinder H has a base $H^2$ formed with a pair of depending spaced lugs $H^3$ straddling the upper end of an arm $C^4$ forming part of a bracket $C^5$ fixedly mounted on a crosspiece $C^6$ of the fixed machine frame. The two lugs, as well as the intermediate arm, are drilled to receive a bolt (not shown) by which the cylinder H and the arm $C^4$ are connected together. The piston is designed to prevent the leakage of air past it and is connected by means of a piston rod $H^4$, passing upwardly through the cylinder head, to a bracket $F^6$ bolted to a crosspiece of the lowermost magazine base frame. The connection between the bracket $F^6$ and the piston rod $H^4$ includes a pair of spaced lugs $F^7$ depending from the bracket and straddling the piston rod, at its upper end, the lugs and the piston rod being drilled to receive a transverse pin $h$ formed with a head at one end and held in place by means of a cotter pin extending transversely through the pin at the other end. The cylinder head is constructed with a gland $H^5$ encircling the piston rod so as to render the cylinder head air tight where the piston rod extends therethrough. Both the cylinder head and the cylinder base are drilled and tapped to receive connections $H^6$ and $H^7$ through which compressed air can be supplied to the cylinder both above and below the piston. When air is admitted to the cylinder H below the piston $H^1$, the latter will move upwardly in the cylinder to raise the magazine shift frame, whereas when air is admitted to the cylinder above the piston, the latter will move downwardly in the cylinder so as to lower the shift frame. During the admission of air to either end of the cylinder, it will be understood that the opposite end of the cylinder is vented to the atmosphere, the specific means for accomplishing this purpose being described hereinafter. It might be stated here that, since the shift frame, together with the magazines supported thereby, are counterbalanced, the air pressure necessary to effect the raising and lowering of the shift frame is relatively low, a pressure of approximately 25 pounds per square inch having been found suitable for the purpose. The low pressure also avoids the danger of damaging the parts should any of the latter stick during operation.

Because of the ease with which the counterbalanced shift frame can be moved, it has been found desirable to control the speed at which the shift frame movement is effected. The mechanism for this purpose is shown in Fig. 10. It is a hydraulic device comprising a cylinder J and piston $J^1$ arranged alongside of and parallel to the cylinder and piston mechanism operating the shift frame and, like said mechanism, connected between the shift frame and a fixed part of the machine in much the same manner. In other words, the hydraulic cylinder has a base $J^2$ provided with lugs $J^3$ connected to an arm $C^7$ projecting upwardly from the fixed bracket $C^5$, while a piston rod $J^4$, connected at its lower end to the piston, has its upper end connected to lugs $F^8$ formed on the shift frame bracket $F^6$ by a pin $h^1$ similar to the pin $h$.

The base $J^2$ of the cylinder J is formed with a port $J^5$ connecting the cylinder below the piston with a passageway $J^6$ arranged parallel with the cylinder and extending upwardly to the cylinder head $J^7$, which likewise is provided with a port $J^8$ connecting the passageway $J^6$ with the cylinder above the piston. According to this arrangement, when the magazine shift frame is raised, it will move the piston $J^1$ upwardly in the cylinder, causing liquid (oil) with which the cylinder is filled both above and below the piston to flow through the port $J^8$ in the cylinder head into the passageway $J^6$ and thence through the port $J^5$ in the cylinder base into the cylinder below the piston. And, similarly, when the magazine shift frame is lowered, the piston $J^1$ will move downwardly in the cylinder J, thus displacing liquid below the piston and causing it to flow in the reverse direction to the other end of the cylinder above the piston. The speed of liquid flow at a given pressure depends upon the minimum cross-sectional area of the passageway or ports between the cylinder head and base and, as this area is constant except under conditions hereinafter referred to, the rate of flow and, therefore, the rate of movement of the shift frame will be constant. Actually, the normal minimum cross-sectional area is found in an apertured washer $J^9$ located between the port $J^8$ and the passageway $J^6$.

Since the movement of the piston $J^1$ corresponds at all times with the movement of the shift frame, it is obvious that the extent of upward movement of the piston equals the downward movement thereof when any two given magazines are interchanged. Consequently, in shifting between magazines, the amount of liquid displaced by the piston upon an upward stroke will be less than that displaced by the piston upon a downward stroke of equal extent because of the presence of the piston rod $J^4$ in that portion of the cylinder above the piston. Accordingly, means are provided to compensate for this difference. The means provided for the purpose include a liquid reservoir $J^{10}$ located in the cylinder head $J^7$ above the cylinder proper and which is more than large enough to contain an amount of liquid equal to the total displacement of the piston rod in the cylinder when the piston is at the lowermost end of its stroke. A port $J^{11}$, located in the cylinder head, provides a communication between the bottom of the reservoir $J^{10}$ and the top of the passageway $J^6$, the port ordinarily being closed by a ball valve $J^{12}$ urged to closing position by a spring $J^{13}$ reacting between the ball and the apertured washer $J^9$ located near the top of the passageway. According to this arrangement, when the piston moves upwardly in the cylinder, suction is created due to the fact that the amount of liquid displaced by the piston above the cylinder is not sufficient to fill the larger volumetric displacement below the piston. The suction thus created will displace the ball from its seat against the action of its associated spring, allowing an amount of liquid from the reservoir to enter the passageway $J^6$ which will be sufficient completely to fill the cylinder below the piston. On the other hand, when the piston $J^1$ is moved downwardly, the amount of liquid displaced is in excess of that required to fill the cylinder above the piston and, accordingly, means are provided for allowing the excess liquid to bleed back into the reservoir.

Figure 11:
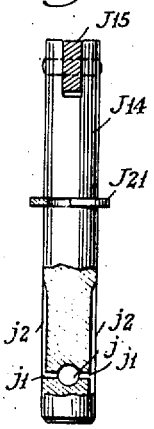
Fig. 11 is a detailed view of the element that controls the effective area of the port in the passageway connecting the opposed ends of the speed control cylinder and piston arrangement.

For reasons which will be described hereinafter, a portion $j$ of the port $J^8$, connecting the upper end of the cylinder J with the passageway $J^6$, is located in a rod $J^{14}$ arranged for limited vertical movement in a hole drilled in the cylinder head $J^7$ at the base of the reservoir $J^{10}$. When this rod is in its lowermost position, the portion $j$ of the port located therein registers with the remaining portions of the port so that no obstruction to the flow of liquid therethrough is created. The means for bleeding the liquid back into the reservoir comprises two small passageways $j^1$ (see Figs. 10 and 11) communicating with the portion $j$ of the port located in the rod at diametrically opposite portions thereof and communicating also with vertical grooves $j^2$ formed in the cylindrical surface of the rod $J^{14}$ and which extend above the bottom of the reservoir when the rod is in its lowermost position.

The main purpose of the vertically movable rod will now be described. Ordinarily, the movement of the shift frame is at a relatively rapid rate, making it desirable to slow up the movement somewhat as the magazines approach their respective operative positions. For this purpose, there is provided mechanism which includes, in addition to the rod $J^{14}$ just mentioned, a bell crank lever $J^{15}$ pivotally mounted in a grooved extension $J^{16}$ of the reservoir wall, and which has one arm thereof extending horizontally into the reservoir, where it is pivotally connected at the top of the rod. The other arm of the bell crank lever extends upwardly and is provided at its upper end with a finger $J^{17}$ arranged to engage one edge of a bar $F^9$ fixed at its upper end on the bracket $F^6$ to which both piston rods $J^4$ and $H^4$ are connected, the bar thus being constrained to move with the shift frame. The bar is guided against lateral movement by a pair of spaced lugs $J^{18}$, projecting from the boss $J^{16}$ formed on the reservoir wall, and against edgewise movement by the boss itself and by a pin $J^{19}$ extending between the lugs and which engages that edge of the bar remote from the reservoir wall. The finger $J^{17}$, mounted on the bell crank lever $J^{15}$, is urged into engagement with the bar $F^9$ by a compression spring $J^{20}$ reacting between the base of the reservoir and a collar $J^{21}$ mounted in a groove in the rod $J^{14}$ about midway of its length. In that edge of the bar $F^9$ which is engaged by the finger $J^{17}$, there are provided a series of notches $F^{10}$ spaced at regular intervals corresponding to the spacing of the magazines. In other words, whenever there is a magazine in operative position, there will be a notch $F^{10}$ in the bar $F^9$ corresponding thereto and located opposite the finger $J^{17}$. When the finger $J^{17}$ is located in a notch $F^{10}$, the rod $J^{14}$ will be located in its uppermost position, as shown in Fig. 10, and the port portion $j$ located therein will be located above its normal position of alignment with the other portions of the port $J^8$ so as to cut off the opening through the port to a substantial extent. Of course, when the port $J^8$ is partially closed in this manner, the flow of liquid therethrough will be substantially retarded. However, when the finger $J^{17}$ rides up onto a high portion of the bar $F^9$ (i. e., a portion between the notches), the bell crank lever $J^{15}$ will be moved in a manner to depress the rod $J^{14}$ against the action of its spring $J^{20}$ to its lowermost position wherein the various portions of the port $J^8$ will be in complete alignment. Under this condition of adjustment, no retardation of liquid flow through the port will occur. As shown, the ends of the notches $F^{10}$ in the bar are bevelled so that, as the bar moves with respect to the finger, the movement of the latter into and out of the notches will be a gradual one.

From what has been said, it is evident that when the magazine shift frame is moved to bring a different selected magazine into operative position, the initial movement of the bar $F^9$ will cause the finger $J^{17}$ to ride up on a high portion thereof, thus depressing the rod $J^{14}$ and opening the port $J^8$ to its full extent, with the result that the shift frame will move at its maximum speed. Then, as the selected magazine approaches its operative position so as to bring the corresponding notch $F^{10}$ in the bar opposite the finger, the rod $J^{17}$, under the action of its associated spring, will rise gradually as the finger rides down into the notch, with the result that the flow of liquid through the port is gradually reduced. This in turn causes the selected magazine to decelerate evenly as it is brought to rest in its operative position, with a complete absence of shock to the parts. The gradual deceleration will also permit the automatic magazine locking device to function evenly and smoothly.

To complete the description of this phase of the invention, it might be stated that a removable cover plate $J^{21}$ is provided for the reservoir $J^{10}$ in the event it is necessary to replenish the liquid. Where the piston rod $J^4$ passes through the cover plate, a gland $J^{22}$ and oil cavity $J^{23}$ are provided for lubricating the piston rod at this point. Provision is also made for adjusting the position of the finger $J^{17}$ with respect to the bell crank lever $J^{15}$, should such adjustments become necessary. It will also be noted that one of the vertical slots $j^2$ in the rod $J^{14}$ extends to the base thereof to permit egress of the liquid from the pocket at its base (see Fig. 11).

Before describing the mechanism that controls the flow of air to the cylinder H to effect the raising and lowering of the magazine shift frame, mention will first be made of the magazine locking device. This locking device includes two reciprocable bolts K located one at each side of the machine and adapted to enter notches $F^{11}$ formed in bars $F^{12}$ fastened one to each of the lateral extending flanges $F^5$ forming part of the front elements of the shaft frame (see Figs. 1, 3 and 12). The bars are fastened at the front of the flanges by machine screws extending through the flanges from the rear. One notch $F^{11}$ is provided in each bar for each of the magazines, and the notches are located so as to be directly in register with the bolts K when the corresponding magazine is in operative position. To insure this relation, lugs $f$ (see Figs. 1 and 3) are fastened to the flanges above and below the notched bars, with set screws $f^1$ threaded through the lugs to engage said bars respectively at the top and at the bottom. The adjustment is effected merely by loosening the screws holding a notched bar $F^{12}$ in position, backing off one set screw and taking up on the other until the proper adjustment is secured, whereupon the notched bar holding screws are again tightened.

The locking bolts K themselves are slidably arranged in brackets $K^1$ secured to side elements of the machine framework and are operated simultaneously by a pneumatic device including a cylinder $K^2$ and piston $K^3$, which device is located on a fixed part of the machine frame near the right hand side (see Figs. 1, 3 and 12). The intermediate operating mechanism between the cylinder-and-piston device and the bolts includes a transverse shaft $K^4$ journalled at its opposite ends in the machine frame and a pair of arms $K^5$ pinned to the shaft, one of said arms, namely, that at the right, being formed with a depending crank portion $K^6$ which is operated by a piston rod $K^7$ associated with the piston proper $K^3$. Each arm $K^5$, at its upper end, is formed with a bifurcated portion $K^8$ straddling a pin $K^9$ extending inwardly from its associated bolt, so that the bolt can be moved by its associated arm positively in either direction.

The piston $K^3$, together with piston rod $K^7$, are arranged for limited travel in the air cylinder $K^2$, being, however, normally held in their forward positions by a relatively heavy spring $K^{10}$ encircling the piston rod and reacting between the piston and the rear end of the cylinder. Provision is made for admitting air under pressure to the cylinder at the front side of the piston, that is, the side opposite that against which the spring acts, an air line $K^{11}$ and connection $K^{12}$ for this purpose being shown. A portion of the piston rod $K^7$ extends beyond the rear end of the cylinder $K^2$ and is provided with a pair of spaced collars $K^{13}$ pinned to the rod at this point. The crank arm $K^6$, operated by the piston, is bifurcated at its lower end so as to straddle the piston rod between the two collars located thereon. The bifurcated portions of the crank arm between the collars have their opposite edges rounded off as at $K^{14}$ so as to accommodate the limited lengthwise movement of the piston rod.

According to the arrangement just described, when it is desired to move the shift frame to bring a different magazine into operative position, air under pressure is admitted to the cylinder $K^2$ in advance of the piston $K^3$, causing the piston, together with the piston rod $K^7$, to move from the solid line position shown in Fig. 12 to the dotted line position shown therein. This movement of the piston rod, through the crank arm connection $K^6$, rocks the shaft $K^4$, and consequently the arms $K^5$ connected to the bolts K, in a counterclockwise direction, thereby withdrawing the bolts from their active positions in the notches $F^{11}$, as shown by the solid lines in Fig. 12, to inactive positions as shown by the dotted lines in said figure. The shift frame is then free to be moved, the bolts K remaining in their inactive positions, free of the notches, until the pressure on the piston $K^3$ is removed. When the selected magazine has arrived in operative position, the air pressure is cut off, whereupon the piston is returned to normal position by the compression spring $K^{10}$ and, at the same time, through the intermediate mechanism described, the bolts will be restored to their normal active positions in the notches corresponding to the newly selected magazine in operative position. The top and bottom edges at the active ends of the bolts K, as well as the outer top and bottom edges of the notches $F^{11}$, are slightly beveled so as to insure the ready entrance of the bolts into the same. It will also be observed that the cylinder $K^2$ on that side of the piston wherein the spring is located is vented to the atmosphere as at $K^{15}$ for reasons which will be well understood.

The admission of air to the cylinder $K^2$ of the shift frame locking device and to the cylinder H of the shift frame raising and lowering device is controlled from the front of the machine by a pair of valves which, although distinct in themselves, are conjointly operated. The valves are located in a common housing L fastened to a bracket $C^8$ mounted on the fixed machine frame near the front thereof (see Fig. 1.) This housing L at the left (looking at the machine from the front) is formed as shown in Figs. 4 and 5, with a vertical chamber having an enlarged upper portion $L^1$ to accommodate the limited movement of a mushroom-type valve $L^2$, and a reduced lower portion $L^3$ with which an elongated stem $L^4$ forming part of the valve, has a sliding fit. In other words, the reduced portion of the chamber acts to guide the valve $L^2$ in its vertical movement. The valve is normally held on a bevelled seat $L^5$, formed where the upper enlarged and reduced lower portions of the chamber meet, by a spring $L^6$ reacting between the upper face of the valve and the lower end of a screw $L^7$ threaded into the chamber $L^1$ and which closes said chamber at the top. The valve $L^2$, just above the mushroom portion thereof, is formed with a reduced cylindrical portion $L^8$ which is encircled by the spring $L^6$ and thus acts to hold the latter in position. Sufficient clearance is provided between the top of the cylindrical portion and the base of the screw to allow for the vertical movement of the valve. The upper enlarged portion $L^1$ of the valve chamber is at all times connected with a suitable source of air pressure through a pipe line $L^9$, whereas the lower reduced portion $L^3$ of the valve chamber, i. e., the portion below the valve seat is connected with the cylinder $K^2$ forming part of the shift frame locking mechanism, the connections being through a port $L^{10}$ in the valve housing and the pipe line $K^{11}$. The pipe line can be traced in Fig. 1.

The valve stem $L^4$, in the portion thereof adjacent the port $L^{10}$ through which the air passes to the cylinder $K^2$ just referred to, is reduced in cross-section so as not to interfere with the passage of air, and at about the level where the larger and smaller portions of the stem meet there is provided at port $L^{11}$ (Figs. 5 and 8) which connects the lower valve chamber $L^3$ with the atmosphere. The valve stem $L^4$ extends somewhat below the valve housing and is adapted to be engaged by an operating element hereinafter to be described. Suffice it to say at the moment, when it is desired to operate the shift frame, the valve stem $L^4$ is pushed upwardly against the action of the spring $L^6$ so as to close the vent port $L^{11}$ and lift the valve $L^2$ from its seat, whereupon air will flow from the upper valve chamber $L^1$ (which, as will be recalled, is connected with the pressure source at all times) through the valve into the lower valve chamber $L^3$ and thence through the port $L^{10}$ and pipe line $K^{11}$ leading to the cylinder $K^2$ of the shift frame locking device causing the latter to be operated in the manner hereinbefore described to release the shift frame for movement. As the newly selected magazine approaches operative position, the valve stem $L^4$ is released, permitting the spring $L^6$ to close the valve and shut off the air pressure from the cylinder $K^2$. As the valve $L^2$ is closed, the lower port $L^{11}$ is again opened, thus venting the cylinder $K^2$ to the atmosphere to reduce the air pressure therein. This reduction in air pressure in the cylinder $K^2$ permits the spring $K^{10}$ through the piston $K^3$ to urge the locking bolts K rearwardly, ready to seat in the notches $F^{11}$ corresponding to the selected magazine when the latter reaches the operative position. As registry is attained, the bolts snap into the notches and thus hold the shift frame against further movement.

The valve for controlling the flow of air to the cylinder H of the magazine raising and lowering device is selectively operable to permit air to be furnished to the top or the bottom of the cylinder, depending upon whether the magazine shift frame is to be lowered or raised. This valve mechanism is best illustrated in Figs. 6 to 9. It presents a somewhat flat circular high pressure chamber M communicating through an inlet port $M^1$, in the rear wall thereof, with the enlarged upper portion $L^1$ of the other valve chamber which, it will be recalled, is connected at all times with the source of fluid pressure. There are three outlet ports $M^2$, $M^3$ and $M^4$, leading from the chamber M through the front wall thereof, the two outermost ports $M^2$ and $M^3$ communicating, one (the port $M^2$) with a chamber $M^5$ located at the top of the valve housing near the front and connected with the top of the air cylinder H through the pipe line $H^6$, and the other (the port $M^3$) with a similar chamber $M^6$ located at the bottom of the valve housing opposite the chamber $M^5$ and which is connected with the bottom of the air cylinder through a pipe line $H^7$. Both pipe connections may be traced in Fig. 1. The third port $M^4$ communicates directly with the atmosphere as shown in Fig. 8.

In the normal position of the parts, the three ports just referred to are closed to the high pressure chamber by a gate valve $M^7$ held tightly against the front wall of the chamber by a spring $M^8$, reacting between the high pressure side of the gate and the base of an opposed recess $M^9$ in which the spring $M^8$ is located. In that face of the gate valve which is adjacent the outlet ports, there is formed a somewhat elongated recess $M^{10}$ just long enough to connect either of the ports $M^2$ or $M^3$ (leading to the cylinder H) with the center port $M^4$ (communicating with the atmosphere, depending upon the location of the gate, but in the normal position of the parts, as shown in Fig. 7, the gate closes the two ports $M^2$ and $M^3$ both from the high pressure side of the valve and from the atmosphere. Of course, in all positions of the gate valve $M^7$, the high pressure side thereof is closed to the port $M^4$ leading to the atmosphere.

Means are provided for rotating the gate valve $M^7$ in one direction or another depending upon whether the shift frame is to be raised or lowered. Such means include a spindle $M^{11}$ extending in a fore-and-aft direction through the valve housing and formed at its inner end with an elongated feather $M^{12}$ engaging in a correspondingly shaped recess in the front face of the gate valve $M^7$, so that the latter is constrained to move with the spindle as the latter is rocked. The spindle is also formed adjacent the valve seat with a collar $M^{13}$ seated in a correspondingly shaped recess in the valve seat and which prevents the spindle from being withdrawn outwardly from its proper position. The spindle $M^{11}$ protrudes beyond the housing L to accommodate actuating means, hereinafter to be described.

Figure 9:
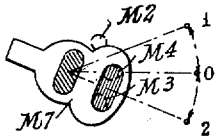
Fig. 9 is a diagrammttic view showing different positions of adjustment of a valve through which the supply of air to the raising and lowering device is controlled.

According to the foregoing arrangement, when the gate valve $M^7$ is in its normal position (see Figs. 7 and 8), both the ports $M^2$ and $M^3$ leading to the cylinder H of the shift frame raising and lowering mechanism are closed. However, when it is desired to lower the magazine shift frame, the spindle $M^{11}$ is rotated in a clockwise direction (looking at the parts from the front of the machine) to move the gate valve to the position shown in Fig. 9, wherein the port $M^2$ communicating with the pipe line $H^6$ leading to the top of the cylinder H, is uncovered or opened to the high pressure side of the valve. Thereupon, air under pressure flows from the source of supply through the upper portion $L^1$ of the other valve chamber, through the intermediate port $M^1$ between it and the gate valve chamber M, and thence through the outlet port $M^2$ to the upper end of the cylinder H. At the same time that the outlet port $M^2$ is uncovered, the outlet port $M^3$, communicating with the lower end of the cylinder H, is connected with the port $M^4$ leading to the atmosphere through the recess $M^{10}$, as shown in Fig. 9, so that the lower end of the cylinder H is vented to the atmosphere. In this way, the air admitted to the upper end of the cylinder H causes the piston $H^1$ therein to be moved downwardly until the desired magazine reaches the operative position, whereupon the gate valve $M^7$ is returned to normal position, shutting off the air supply.

And, similarly, when it is desired to raise the shift frame, the gate valve $M^7$ is turned from normal position in the opposite direction so as to connect the outlet port $M^3$ (communicating with the lower end of the cylinder H) with the high pressure side of the valve while at the same time connecting the outlet port $M^2$ (communicating with the upper end of the cylinder) with the vent port $M^4$ through the recess $M^{10}$. The operations are now reversed, i. e., air is supplied to the lower end of the cylinder H below the piston $H^1$, while the upper end of the cylinder is vented to the atmosphere, so that the magazine shift frame is raised to bring the desired magazine into operative position, whereupon the gate valve $M^7$ is returned to normal position, shutting off the air supply.

Figure 6:
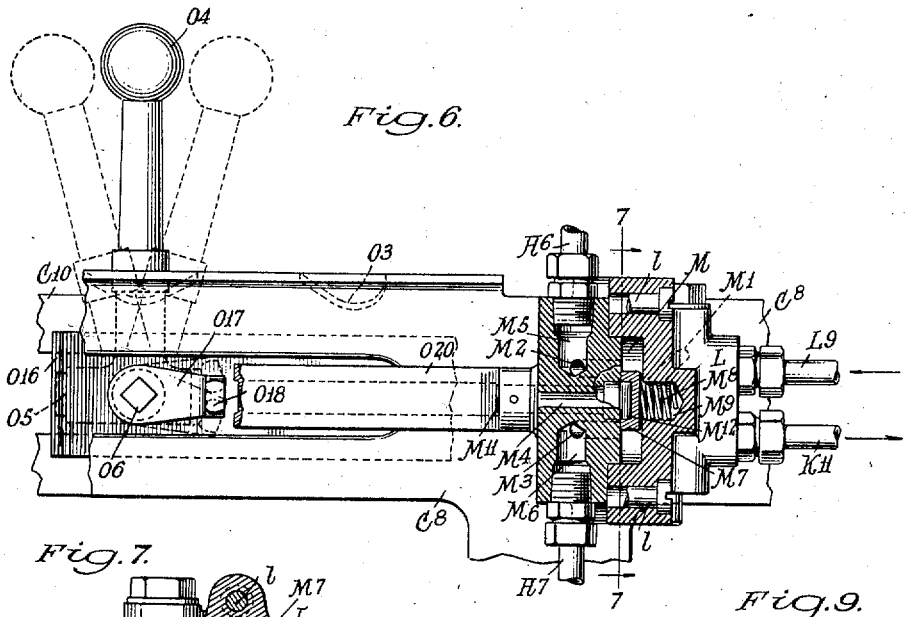
Fig. 6 is a sectional view taken on line 6—6 of Fig. 3.
Figure 7:
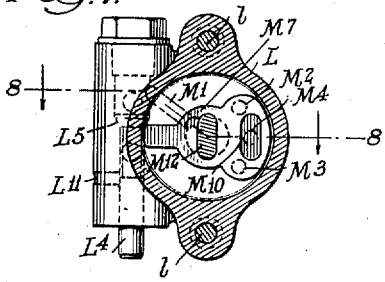
Fig. 7 is a sectional view taken on line 7—7 of Fig. 6.
Figure 8:
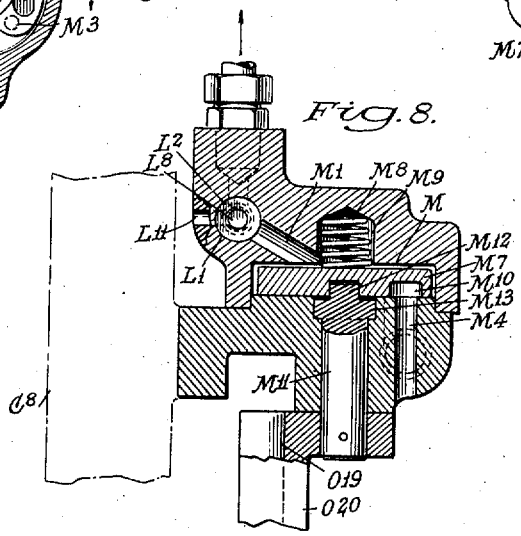
Fig. 8 is a sectional view taken on line 8—8 of Fig. 7.

Merely for expediency of manufacture, the valve housing L is made of two castings connected together by machine screws *l*, as shown in Figs. 6, 7 and 8.

Before proceeding with the description of the mechanism for operating the valves, mention will first be made of the feeler devices which operate to determine whether or not the magazines are free to be moved, since these devices are operated by the same mechanism through which both the valves are conjointly controlled.

Referring to Fig. 1, there is provided the usual feeler device between the assembler entrance and the magazines and which consists of a frame N with a cross element (not shown) arranged to be moved downwardly across the assembler entrance D to determine whether any obstruction is present (such as a protruding matrix) that would prevent the movement of the magazines. This frame N is operated from a pair of arms $N^1$ located one at each side of the machine and extending rearwardly from a transverse shaft $N^2$ adapted to be rotated in a clockwise direction to move the frame downwardly and then in the opposite direction to restore the frame to its normal position. A feeler device is also provided in conjunction with the distributor and includes a plate $N^3$ adapted to be moved rearwardly between two of the distributor screws to determine whether or not the distributor bar is free of matrices. The plate is supported from depending pivotally mounted arms $N^4$ which are normally spring-held in a position to maintain the feeler plate inactive. The two feeler devices are conjointly operated through the medium of a vertically movable link $N^5$ located at the front of the machine and pivotally connected at its upper end to an arm $N^6$ fixed to and extending forwardly from the cross shaft $N^2$ previously referred to. The connections to the distributor feeler include an upwardly extending arm $N^7$ likewise fixed to said shaft and connected at its upper end to a horizontal rod $N^8$ operating a linkage, including two bell crank levers $N^9$ and $N^{10}$ and an intermediate vertically disposed rod $N^{11}$, the upper bell crank lever $N^{10}$ being mounted in a position to push the distributor feeler plate $N^3$ beneath the distributor bar when the parts are operated. The horizontal rod $N^8$ is normally held in its forward or inactive position by a spring $N^{12}$ connected at one end to the rod $N^8$ and anchored at its other end to a fixed part of the machine. According to this arrangement, as the vertical rod $N^5$ at the front end of the machine is moved upwardly, the transverse shaft $N^2$, which is operated thereby, will be rocked in a clockwise direction against the tension of the spring $N^{12}$, this operation serving to operate both of the feeler devices in well known manner, and when said rod $N^5$ is released, the feeler devices will be returned to their normal inoperative positions under spring pressure.

Adverting now to the control device O which is arranged at the front of the machine adjacent the keyboard (see Figs. 1 and 2), it will be observed that it is supported by the same bracket $C^8$ that supports the valve housing L. It is provided with a casing $O^1$ enclosing the operative parts and formed with a fore-and-aft slot $O^2$ having a series of flared notches $O^3$ in one edge corresponding in number to the magazines in the shift frame. The control is effected through the medium of a handle or lever $O^4$ which, in its normal position, reposes in one or another of the notches $O^3$, depending upon which of the magazines is in operative position. The notches are numbered 1 to 4, starting at the front, the designation referring to the magazines in order, starting from the top.

When it is desired to substitute a different magazine for the one in operative position, the lever $O^4$ is moved from an angular position, as shown by the solid lines in Fig. 4, out of the notch $O^3$ in which it is located into the vertical position as shown by the dotted lines in said figure. In the latter position, the lever $O^4$ is free to be moved backwardly or forwardly in the slot $O^2$ depending upon which of the magazines it is desired to use. Thus, if the No. 2 magazine is in operative position (i. e., the one second from the top), and it is desired to substitute the No. 4 magazine therefor (i. e., the bottom magazine), the lever $O^2$ is moved out of the No. 2 notch and along the slot $O^2$ until it arrives opposite the No. 4 notch, and when said lever is moved into the No. 4 notch, the corresponding magazine will be in operative position. Or, if the topmost magazine is desired instead, the lever $O^4$, after being withdrawn from the No. 2 notch, is moved in the opposite direction until it arrives in a position wherein it can be rocked into the No. 1 notch. The motion of the lever $O^4$ as it is shifted from one notch to another in practice is an even, continuous one. As will be pointed out later on, the lever $O^4$ is mounted by what in effect is a universal joint, enabling it to be rocked in a lateral direction as well as in a fore-and-aft direction simultaneously, thus permitting the lever to be guided by the flared contour of the notches as it is shifted out of one notch and into another. To be more specific, as the operator shifts the lever, say out of notch No. 2 and into notch No. 4, it will be his natural tendency to follow the flared edge at the rear of notch No. 2, so that the actual movement of the lever in passing to the fore-and-aft slot $O^2$ will be along an angular path rearward and to the right. And similarly, in moving the lever $O^4$ into notch No. 4, by following the flared edge at the front of notch No. 4, its actual movement will be along an angular path rearward and to the left.

As shown in Figs. 3 and 4, the lever $O^4$ is mounted for lateral pivotal movement between two arms of a U-shaped member $O^5$ formed at the end of a transverse rock shaft $O^6$ which, in addition to its rocking motion, is capable of being moved in a fore-and-aft direction in a manner and for a purpose hereinafter described. Below its pivotal connection, the lever is formed with a hooked portion $O^7$ adapted to engage the right-hand face of a plate $O^8$ which, as shown in Figs. 3 and 4, is pinned to a fore-and-aft rock shaft $O^9$ journalled at its opposite ends in lugs $O^{10}$ and $O^{11}$ offset to the left of the main supporting bracket $C^8$. According to this arrangement, when the lever $O^4$ is first moved out of the notch in which it happens to be located, the lower hooked portion $O^7$ thereof will engage the plate $O^8$ and rock the shaft $O^9$ from the position shown by the solid lines in Fig. 4 to the position shown by the dotted lines therein. This movement of the rock shaft accomplishes two things, first, it actuates the feeler devices to determine whether or not the shift frame is free to be moved, and second, it operates the valve that controls the supply of air for operating the shift frame locking device. Both operations are effected through a single arm $O^{12}$ pinned on the rock shaft $O^9$ at its rear end where it extends beyond the rear lug $O^{11}$ in which its is journalled. At its left end, looking at the machine from the front, the arm $O^{12}$ is formed with a ball $O^{13}$ located between the bifurcated rear end portions of a small fore-and-aft lever $O^{14}$ pivotally mounted at its center on the lug $O^{11}$ that supports the rock shaft $O^9$ and which is connected at its front end to the vertical rod $N^5$ that operates the feeler devices. Thus, when the arm $O^{12}$ is actuated by the rock shaft $O^9$, its first act is to raise the rod $N^5$ and, if no obstruction is presented to its movement (which indicates that the magazines are all clear), the arm will continue to the dotted line position shown in Fig. 4.

At is right end, the arm $O^{12}$ is provided with a banking screw $O^{15}$ adapted to engage the lower end of the stem $L^2$ through which the valve $L^2$ is operated that controls the admission of air to the cylinder $K^2$ associated with the shift frame locking device. The full movement of the control lever $O^4$ out of a notch $O^3$ is sufficient to cause the arm $O^{12}$ fully to open the valve $L^2$, with the consequent unlocking of the shift frame in the manner and for the purpose hereinbefore described. In other words, when the control lever $O^4$ has reached its rightmost position, the magazine shift frame is free to be raised or lowered. At this point, it might be stated that the plate $O^8$, through which the rock shaft $O^9$ is operated by the control lever $O^4$, is coextensive in length with the slot $O^2$ so it may cooperate with the lever in any position of the latter. It might also be stated here that the banking screw $O^{15}$ on the end of arm $O^{12}$ is arranged for limited adjustment in the event occasion therefor arises.

As previously stated, the control lever $O^2$ is pivotally supported by a pair of spaced arms presented by a U-shaped member $O^5$ formed at the left end of the small rock shaft $O^6$. This rock shaft is journallel in a slide $O^{16}$ near the front end thereof, which slide is capable of being moved in a fore-and-aft direction to accommodate the fore-and-aft movement of the control lever $O^4$. The slide $O^{16}$ (see Figs. 3 and 4) is guided in a longitudinal recess $C^9$ formed in the supporting bracket $C^8$ and is held in place by a retaining plate $C^{10}$ fastened to the bracket and which likewise is slotted to accommodate said fore-and-aft movement of the control lever. The rock shaft $O^6$, at the end opposite that on which the control lever is mounted, extends through a slot $C^{11}$ in the supporting bracket $C^8$ which slot too is of sufficient length to accommodate the fore-and-aft lever movement and the shaft is provided at said end with an arm $O^{17}$ presenting a finger $O^{18}$ adapted to engage in a longitudinal groove $O^{19}$ formed in a fore-and-aft bail member $O^{20}$. The bail member is formed at its opposite ends with offset lugs $O^{21}$, that at the front being pivotally mounted in a portion of the fixed bracket $C^8$, whereas that at the rear is pinned to the spindle $M^{11}$ which operates the gate valve $M^7$ (see Figs. 3, 6 and 8).

According to this arrangement, the control lever $O^4$, can be rocked through a limited distance forwardly or rearwardly, this distance being determined by the clearance between the edges of the slot in the retaining plate $C^{10}$ and the base portion of the U-shaped section $O^5$ of the rock shaft $O^6$ in which the control lever is supported. If it is desired to lower the magazine shift frame, the control lever $O^4$ is moved forwardly to the left-hand dotted line position shown in Fig. 6 and, when this occurs, the shaft $O^6$ on which it is supported will be rocked in the same direction, with the result that the finger $O^{18}$ presented by the arm $O^{17}$ mounted at the end of said rock shaft moves upwardly, causing the bail $O^{20}$ to be rocked in a clockwise direction (looking at the parts from the front). Such movement of the bail turns the gate valve $M^7$ to the position in which the high pressure side thereof communicates with the top of the cylinder H of the shift frame raising and lowering mechanism and in which the bottom of the cylinder is vented to the atmosphere, and this condition of the parts will be maintained until the control lever seats in the notch corresponding to the selected magazine. On the other hand, if it is desired to raise the magazine shift frame, the control lever $O^4$ is rocked rearwardly to the right-hand dotted line position shown in Fig. 6, and when this occurs, the finger $O^{18}$ on the arm mounted on the lever-controlled rock shaft $O^6$ will be moved downwardly causing the bail $O^{20}$ to be turned to a position wherein the gate valve $M^7$ operated thereby uncovers the port connecting the high pressure side of the valve with the bottom of the cylinder H and opens the upper end of the cylinder to the atmosphere, and again, this condition of the parts will be maintained until the lever $O^4$ seats in the notch corresponding to the selected magazine.

The slide $O^{16}$ is, through suitable gearing, connected to the shift frame so that the movements of the two will correspond. Thus, looking at Figs. 1, 2 and 3, it will be observed that the slide $O^{16}$ just referred to extends somewhat beyond the rear end of the supporting bracket $C^8$, which in turn extends somewhat rearwardly of the valve housing L. In this portion of the bracket, the slide is maintained in its groove by a face plate $C^{12}$ similar to that at the front, except for the absence of the slot. In the upper edge of the slide $O^{16}$ near the rear end thereof, there is provided a series of gear teeth $O^{22}$ arranged to mesh with a pinion $O^{23}$ which in turn meshes with an intermediate gear $O^{24}$ located between the pinion and the gear $G^1$ located at the right end of the transverse shaft G and which is driven from the corresponding rack $G^2$ at the right of the shift frame. Both the pinion and the intermediate gear are rotatably mounted on stub shafts projecting laterally from an arm $C^{13}$ that extends upwardly from the supporting bracket $C^8$. Consequently, when the shift frame is raised, the slide $O^{16}$, through the gear train just mentioned, is moved rearwardly through a distance equal to that through which the shift frame moves, whereas, when the shift frame is moved downwardly, the slide is moved forwardly through a corresponding distance. With the movement of the shift frame and slide thus synchronized, the notch $O^3$ in which the control lever $O^4$ is located not only will indicate which of the magazines is in operative position, but will also serve to determine the extent the lever will have to be moved to insure the arrival of a newly selected magazine in operative position. In seating in the notch $O^3$ corresponding to a newly selected magazine, the lever $O^4$ will follow the flared contour at the near edge of the notch and in so doing will have a movement made up of two components—one, a leftward component (induced by the spring $N^{12}$) which will release the shift frame locking bolts K (see Fig. 4), and second, a fore-and-aft component (induced by the continued movement of the slide $O^{16}$) which will rock the lever to its normal position for shutting off the air supply to the upper end of the cylinder H. The sequence of operation is such that the locking bolts K are released for operation prior to shutting off the air to the cylinder H, with the result that the shift frame continues to move until the locking bolts can spring into place and properly locate it. Thus, the initial movement of the arm $O^{12}$ back to normal position permits the valve $L^2$ to be closed, thus relieving the air pressure in the cylinder $K^2$ and freeing the spring $K^{10}$ to actuate the bolts K; whereas, the complete closing of the valve supplying air to the cylinder H is not effected until the lever $O^4$ has been straightened up within the notch by the continued movement of the slide $O^{16}$, it being obvious that the slide will continue to move until the shift frame is brought to a stop by the snapping of the (now freed) locking bolts into the notches $F^{11}$ corresponding to the newly selected magazine.

A clear picture of what occurs in changing from one magazine to another may be had from a study of Fig. 13, which illustrates various positions of the hand lever $O^4$ as it is shifted from say notch No. 1 to say notch No. 2. When the parts are at rest with the top magazine in operative position, the hand lever $O^4$ will occupy dotted line position No. 1 (corresponding to the full line position of the lever shown in Fig. 4), the lever in this (its normal) position being inclined to the left in notch No. 1 but neither inclined toward the front nor back. To substitute the second magazine from the top, the operator moves the lever out of notch No. 1 into the slot $O^2$, pressing it rightward and rearward until it assumes full line position No. 2 (corresponding to the rearward dotted line position shown in Fig. 6). Such compound movement of the hand lever (the slide $O^{16}$ remaining stationary) has the effect of withdrawing the locking bolts K to free the shift frame and of charging the cylinder H at the bottom while venting it at the top, thus inaugurating the upward movement of the shift frame. As the shift frame moves upward, the hand lever will be moved bodily rearward along the slot $O^2$ due to its mounting on the slide $O^{16}$ which, it will be remembered, is connected to the magazine shift frame. As it is thus moved along the slot $O^2$, the hand lever will, of course, remain inclined toward the rear to continue the admission of compressed air to the cylinder H and will be held against movement toward the left by the left wall of the slot $O^2$ to maintain the locking bolts withdrawn. Upon its arrival at the entrance to notch No. 2, however, the hand lever (under the influence of the spring $N^{12}$) will enter said notch, being moved to the left along the forwardly flared edge of the notch until it seats in the bottom thereof, as represented by dotted line position No. 3, whereby the locking bolts K will be released and stand ready to snap into the second set of notches $F^{11}$ when the shift frame has completed its full movement to bring the second magazine into operative position. During its final stage of movement, the shift frame will continue to move the slide $O^{16}$ on which the hand lever is mounted, and such continued movement of the slide will rock the lever, now seated in notch No. 2, from dotted line position No. 3 to dotted line position No. 4, or, in other words, back to its original or normal position with respect to the slide $O^{16}$. As the hand lever is thus mechanically restored to its normal position, air pressure will be shut off from the cylinder H (by the closing of the gate valve $M^7$) and the shift frame brought to rest, the newly selected magazine being located and held in operative position by the snapping of the locking bolts K into the second set of notches $F^{11}$. Hence, it will be seen that, while the start of the magazine shifting movement is due to a manual operation (by the movement of the hand lever from position No. 1 to position No. 2), the arrest of the newly selected magazine in operative position will be entirely automatic (by the movement of the hand lever first to position No. 3 and then to position No. 4). While such is the actual operation of the parts, the operator in changing from one magazine to another will ordinarily keep hold of the hand lever throughout the whole period, this because the operation takes place so rapidly that there is no conscious realization on the operator's part of what is occurring. Indeed, so far as the operator is concerned, he merely has to move the hand lever out of one notch and direct it into a new notch corresponding to the magazine to be selected.

It will be understood, of course, that if one or more notches intervene between the previously selected notch and the newly selected notch, as for example in shifting from notch No. 1 to notch No. 4, the operator will have to hold the hand lever out of the intervening notches against the reaction of the spring $N^{12}$ as the hand lever is moved bodily along the slot $O^2$, but again it is pointed out that the bodily shifting of the hand lever by the slide $O^{16}$ is so rapid that the operator is almost unconscious of the tendency of the hand lever to be pulled into the intervening notches.

It may also be explained that if, during a change from one magazine to another, the operator wishes to arrest the movement of the shift frame at any point along the slot $O^2$, this can be done merely by manually straightening up the hand lever within the slot so as thereby to shut off air pressure to the cylinder H. This capacity to arrest the movement of the shift frame at will is of advantage in avoiding possible damage to the parts in the event that the movement of the shift frame should be obstructed, as for instance by matrices protruding from one or another of the magazines. It is even possible by such manual arrest of the shift frame to bring a newly selected magazine into operative position before the locking bolts are released, but it is obvious that this manual operation might present some difficulty because of the need for exact registration between the locking bolts and their cooperating notches on the shift frame.

In the accompanying drawings, the invention has been shown merely in preferred form and by way of example, but obviously many changes and variations may be made therein without departing from its spirit. It is to be understood, therefore, that the invention is not limited to any specific embodiment, except insofar as such limitations are specified in the appended claims.

This application is a continuation in part of application Serial No. 311,091, filed December 27, 1939.

Having thus described by invention, what I claim is:

1. In or for a typographical composing machine having a matrix magazine movable in different directions into and out of operative position, a magazine shifting device operable independently of the machine drive and comprising pneumatic means for moving the magazine, and means for controlling the operation of said pneumatic means.

2. In or for a typographical composing machine having a matrix magazine movable in different directions into and out of operative position, a magazine shifting device operable independently of the machine drive and comprising pneumatic means operable selectively in either of two directions to effect the movement of the magazine, and means for controlling the operation of said pneumatic means.

3. In or for a typographical composing machine having a matrix magazine movable in different directions into and out of operative position, a magazine shifting device comprising a cylinder and piston arrangement connected between the magazine and a fixed part of the machine, and means for admitting air under pressure into the cylinder at one side of the piston to move the magazine in one direction and at the opposite side of the piston to move the magazine in the opposite direction.

4. In or for a typographical composing machine having a matrix magazine movable in different directions into and out of operative position, a magazine shifting device connected between the magazine and a fixed part of the machine frame and including a cylinder and piston arrangement, means for admitting air under pressure to the cylinder at one side of the piston or the other, depending upon the direction in which the magazine is to be shifted, and means for simultaneously venting the cylinder at the opposite end of the piston to the atmosphere.

5. A magazine shifting device according to claim 4, wherein the means for admitting air under pressure to the cylinder includes a valve having three outlet ports, one communicating with the atmosphere and the others communicating one with each end of the cylinder, a source of air pressure, and means normally acting to shut off the last-mentioned two ports from the source of air pressure, but adjustable to connect either of said two ports with the source of air pressure while simultaneously connecting the other of said two ports with the third port leading to the atmosphere.

6. In or for a typographical composing machine having a matrix magazine movable in different directions into and out of operative position, the combination of a pneumatically operated magazine shifting device and means acting automatically to regulate the speed of operation of said device.

7. In or for a typographical composing machine having a matrix magazine movable in different directions into and out of operative position, the combination of a pneumatically operated magazine shifting device and a hydraulic speed regulator for said magazine shifting device.

8. In or for a typographical composing machine having a matrix magazine movable in different directions into and out of operative position, the combination of a magazine shifting device, and means for controlling the speed of operation of said device, comprising a hydraulic unit in which the liquid is caused to flow as the magazine shifting device is operated and wherein the rate of liquid flow determines the speed of operation of the magazine shifting device, and means in said hydraulic unit for regulating the rate of liquid flow therein.

9. In or for a typographical composing machine having a matrix magazine movable in different directions into and out of operative position, the combination of a magazine shifting device, and means for controlling the speed of operation of said device, comprising a hydraulic cylinder and piston arrangement with a passageway interconnecting the ends of the cylinder on opposite sides of the piston whereby as the shifting device is operated to move the magazine, liquid will flow from one end or the other of the cylinder to the opposite end depending upon the direction of magazine movement, and means in said passageway for controlling the rate of liquid flow therein.

10. In or for a typographical composing machine having a matrix magazine movable in different directions into and out of operative position, the combination of a magazine shifting device, and means for controlling the speed of operation of said device, comprising a hydraulic cylinder and piston arrangement with a passageway interconnecting the ends of the cylinder on opposite sides of the piston, whereby as the shifting device is operated to move the magazine, liquid will flow from one end or the other of the cylinder to the opposite end depending upon the direction of magazine movement, and means adjustable in accordance with the position of the magazine for controlling the rate of liquid flow between the ends of the cylinder.

11. In or for a typographical composing machine having a matrix magazine movable in different directions into and out of operative position, the combination of a magazine shifting device, and means for controlling the speed of operation of said device, comprising a hydraulic cylinder and piston arrangement with a passageway interconnecting the ends of the cylinder on opposite sides of the piston, whereby as the shifting device is operated to move the magazine, liquid will flow from one end or the other of the cylinder to the opposite end depending upon the direction of magazine movement, and means including a port in the passageway through which the liquid flows and which is adjustable in effective area to control the rate of liquid flow therethrough.

12. In or for a typographical composing machine having a plurality of matrix magazines shiftable into and out of operative position, the combination of a magazine shifting device, and means for controlling the speed of operation of said device, said means including a hydraulic unit in which liquid is caused to flow as the magazine shifting device is operated and wherein the rate of flow determines the speed of operation of the magazine shifting device, and means operating automatically as any magazine is moved into operative position for controlling the rate of liquid flow in a manner to reduce the speed of operation of the magazine shifting device.

13. In or for a typographical composing machine having a matrix magazine movable in different directions into and out of operative position, the combination of a magazine shifting device, and means for controlling the speed of operation of said device, comprising a hydraulic cylinder and piston arrangement with a piston rod connected at one side of the piston and extending through the cylinder head at one end thereof, a passageway interconnecting the ends of the cylinder on opposite sides of the piston whereby as the shifting device is operated to move the magazine, liquid will flow from one end of the cylinder to the opposite end thereof depending upon the direction of magazine movement, and means for compensating for differences in the amount of liquid displaced from the cylinder at one side of the piston and that which flows into the cylinder at the opposite side of the piston during any movement of the latter due to the presence of said piston rod.

14. In or for a typographical composing machine having a matrix magazine movable in different directions into and out of operative position, the combination of a magazine shifting device, and means for controlling the speed of operation of said device, comprising a hydraulic cylinder and piston arrangement with a piston rod connected at one side of the piston and extending through the cylinder head at one end thereof, a passageway interconnecting the ends of the cylinder on opposite sides of the piston whereby as the shifting device is operated to move the magazine, liquid will flow from one end of the cylinder to the opposite end thereof depending upon the direction of magazine movement, and a reservoir for supplying liquid to the end of the cylinder opposite that wherein the piston rod is located to maintain said end of the cylinder full when a movement of the piston displaces liquid from the opposite end of the cylinder, and for receiving liquid in excess of that necessary to fill the cylinder at the end wherein the piston rod is located when the movement of the piston is in the opposite direction.

15. In or for a typographical composing machine having a matrix magazine adapted to be moved into and out of operative position, the combination of a locking mechanism for maintaining the magazine in operative position, pneumatically operated means for operating the locking mechanism, and means for controlling the operation of said pneumatically operated means.

16. In or for a typographical composing machine having a matrix magazine adapted to be moved into and out of operative position, the combination of a locking mechanism for maintaining the magazine in operative position, pneumatically operated means for rendering the locking mechanism inactive, and means for controlling the operation of said pneumatically operated means.

17. In or for a typographical composing machine having a matrix magazine adapted to be moved into and out of operative position, the combination of a locking mechanism for maintaining the magazine in operative position, pneumatically operated means for rendering the locking mechanism inactive, spring means for restoring the locking mechanism to active position, and means for controlling the operation of said pneumatically operated means.

18. In or for a typographical composing machine having a plurality of matrix magazines shiftable in one direction or another to bring a selected magazine into operative position, the combination of a pneumatically operated magazine shifting device, means operated selectively in one way or another, depending upon the direction in which the magazines are to be shifted, to control the operation of the magazine shifting device, and means acting in conjunction with said control means and operable in accordance with the movement of the magazines to indicate when the selected magazine is in operative position.

19. In or for a typographical composing machine having a plurality of matrix magazines shiftable in one direction or another to bring a selected magazine into operative position, a magazine shifting device including a cylinder and piston arrangement operable by air pressure and adapted to move the magazines in one direction or another depending upon the end of the cylinder to which the air under pressure is admitted, a valve for selectively connecting one end of the cylinder or the other to a source of air pressure, means for operating said valve, and means acting in conjunction with the valve operating means and operable in accordance with the movement of the magazines to indicate when the selected magazine is in operative position.

20. In or for a typographical composing machine having a plurality of matrix magazines shiftable in one direction or another to bring a selected magazine into operative position, a magazine shifting device including a cylinder and piston arrangement operable by air pressure and adapted to move the magazines in one direction or another depending upon the end of the cylinder to which the air under pressure is admitted, a valve for selectively connecting one end of the cylinder or the other to a source of air pressure, manually operable means for operating said valve and movable by the operator differently depending upon the direction of magazine movement, and means operable in accordance with the movement of the magazines to locate said manually operable means in different positions depending upon the magazine in operative position.

21. In or for a typographical composing machine having a plurality of matrix magazines shiftable in one direction or another to bring a selected magazine into operative position, a magazine shifting device including a cylinder and piston arrangement operable by air pressure and adapted to move the magazines in one direction or another depending upon the end of the cylinder to which the air under pressure is admitted, a valve for selectively connecting one end of the cylinder or the other to a source of air pressure, means including a lever for operating said valve, said lever being pivotally mounted and movable about its pivot in one direction or another depending upon the desired direction of magazine movement, and a member on which said lever is mounted, which member is movable in accordance with the movement of the magazines to locate the lever in different positions depending upon the magazine in operative position, and in the same direction as the lever is pivoted in inaugurating the movement of the magazines.

22. In or for a typographical composing machine having a plurality of matrix magazines shiftable in one direction or another to bring a selected magazine into operative position, a magazine shifting device including a cylinder and piston arrangement operable by air pressure and adapted to move the magazines in one direction or another depending upon the end of the cylinder to which the air under pressure is admitted, a valve for selectively connecting one end of the cylinder or the other to a source of air pressure, means including a lever for operating said valve, said lever being pivotally mounted upon a slide and movable about its pivot in one direction or another depending upon the desired direction of magazine movement, and connections for actuating the slide in synchronism with the magazine movement and in one direction or another depending upon the direction of magazine movement, whereby said lever is located in one position or another according to the magazine in operative position, said connections being such that the direction of movement imparted to the slide accords with the direction in which the lever is pivotally moved to inaugurate the magazine movement.

23. In or for a typographical composing machine having a matrix magazine shiftable into and out of operative position, the combination of a lock device for maintaining the magazine in operative position, a pneumatically operated device for shifting the magazine, a pneumatically operated device for operating the lock device, and means for conjointly controlling the operation of both said pneumatically operated devices.

24. In or for a typographical composing machine having a matrix magazine shiftable into and out of operative position, the combination of a lock device for maintaining the magazine in operative position, a pneumatically operated device for shifting the magazine, a pneumatically operated device for operating the lock device, and means for controlling the operation of said pneumatically operated devices which means includes a common member operable to effect the operation of the lock device to release the magazine and to effect the shifting of the magazine.

25. In or for a typographical composing machine having a plurality of matrix magazines mounted in a shift frame movable to bring any selected one of said magazines into operative position, the combination of a lock device for maintaining the shift frame in its different positions wherein a magazine is operative, a pneumatically operated device for moving the shift frame in one direction or another depending upon the magazine selected, a pneumatically operated device for operating the lock device, and means for controlling the operation of said pneumatically operated devices, said means including a common member operable first to effect the release of the shift frame and its movement in the desired direction, and then to arrest the movement of the magazine shift frame and lock it in its newly adjusted position.

26. In or for a typographical composing machine having a plurality of matrix magazines mounted in a shift frame movable to bring any selected one of said magazines into operative position, the combination of a lock device for maintaining the shift frame in its different positions wherein a magazine is operative, a pneumatically operated device for moving the shift frame in one direction or another depending upon the magazine selected, a pneumatically operated device for operating the lock device, and means for controlling the operation of said pneumatically operated devices, said means including a common member operable first to effect the release of the shift frame and its movement in the desired direction, and then to arrest the movement of the magazine shift frame and lock it in its newly adjusted position, and means including said common member for indicating which of the magazines is in operative position.

27. In or for a typographical composing machine having a plurality of matrix magazines mounted in a shift frame movable to bring any selected one of said magazines into operative position, the combination of a lock device for maintaining the shift frame in its different positions wherein a magazine is operative, a pneumatically operated device for moving the shift frame in one direction or another depending upon the magazine selected, a pneumatically operated device for operating the lock device, two valves, one operable to control the operation of the pneumatic device operating the lock device, and the other operable selectively to control the operation of the pneumatic device operating the shift frame in a manner to effect the movement of the shift frame in one direction or another as desired, and means for operating said valves including a common member operable in one direction to operate the first mentioned valve and in another direction to operate the second mentioned valve, and finally operable in the reverse directions to restore the valves to their normal positions.

28. In or for a typographical composing machine having a plurality of matrix magazines mounted in a shift frame movable to bring any selected one of said magazines into operative position, the combination of feeler devices for determining whether or not the magazines are free to be moved, a lock device for maintaining the shift frame in any of its adjusted positions, a pneumatically operated device for moving the shift frame in one direction or another depending upon the magazine selected, a pneumatically operated device for operating the lock device, and means including a common member for conjointly controlling the operation of the feeler devices and both said pneumatically operated devices.

29. In or for a typographical composing machine having a plurality of matrix magazines mounted in a shift frame movable to bring any selected one of said magazines into operative position, the combination of feeler devices for determining whether or not the magazines are free to be moved, a lock device for maintaining the shift frame in any of its adjusted positions, a pneumatically operated device for moving the shift frame in one direction or another depending upon the magazine selected, a pneumatically operated device for operating the lock device, a member movable in accordance with the movement of the shift frame for indicating by its position which of the magazines is in operative position, and means conjointly operated by said member regardless of its position for controlling the operation of the feeler devices and both said pneumatically operated devices.

30. In or for a typographical composing machine having a matrix magazine movable in different directions into and out of operative position, the combination of a supporting frame for the magazine, a magazine shifting device acting directly on said frame, and interconnected means distinct from said magazine shifting device acting at laterally spaced parts of the frame for equalizing its movement during a magazine shifting operation.

31. In or for a typograpical composing machine having a matrix magazine movable in different directions into and out of operative position, the combination of a supporting frame for the magazine, a magazine shifting device acting directly on said frame, a pair of spaced racks mounted on the frame, and a pair of interconnected pinions cooperating with the racks for equalizing the movement of the frame during a magazine shifting operation, said racks and pinions being distinct from the magazine shifting device.

32. In or for a typographical composing machine having a matrix magazine movable in different directions into and out of operative position, the combination of a supporting frame for the magazine, a magazine shifting device acting directly on said frame, interconnected devices cooperating with the frame at opposite sides thereof for equalizing its movement during a magazine shifting operation, and means acting through said devices for substantially counterbalancing the weight of the magazine and the supporting frame thereof.

33. In or for a typographical composing machine having a matrix magazine movable in different directions into and out of operative position, the combination of a supporting frame for the magazine, a magazine shifting device acting directly on said frame, means including rack and pinion devices acting at laterally spaced parts of the frame for equalizing its movement during a magazine shifting operation, a shaft for the pinion device, and means for substantially counterbalancing the weight of the magazine and the supporting frame thereof, said means including devices acting through said shaft and the rack and pinion devices.

34. In or for a typographical composing machine having a plurality of individually removable and replaceable matrix magazines shiftable into and out of operative position, the combination of a magazine shifting device, and means for substantially counterbalancing the weight of the magazines, said means including a plurality of counterbalancing units adapted each to account for a unit of weight equivalent to that represented by an individual magazine, and capable each of being rendered operative or inoperative, as desired, depending upon the number of magazines in the machine.

35. In or for a typographical composing machine having a plurality of individually removable and replaceable matrix magazines shiftable into and out of operative position, the combination of a pneumatically operated magazine shifting device, and means for substantially counterbalancing the weight of the magazines, said means including a plurality of counterbalancing units adapted each to account for a unit of weight equivalent to that represented by an individual magazine, and capable each of being rendered operative or inoperative, as desired, depending upon the number of magazines in the machine.

36. In or for a typographical composing machine having a matrix magazine movable into and out of operative position in an inclined path, a magazine shift frame comprising inclined means disposed below the magazine in line with the path of magazine movement, guiding devices cooperating with said means, and connections whereby the load of the magazine is transmitted to said inclined means at the opposite ends thereof.

37. In or for a typographical composing machine having a plurality of matrix magazines mounted in a shift frame and movable to bring different selected ones of said magazines into operative position, the combination of a magazine selecting member movable to as many different positions as there are magazine selecting positions of the shift frame, and power means controlled by the movement of the magazine selecting member to any given position for moving the shift frame to bring the corresponding magazine into operative position, said power means being restored to neutral after each such shift frame movement.

38. In or for a typographical composing machine having a plurality of matrix magazines mounted in a shift frame and movable to bring different selected ones of said magazines into operative position, the combination of a magazine selecting member movable to as many different positions as there are magazine selecting positions of the shift frame, and pneumatic means controlled by the movement of the magazine selecting member to any given position for moving the shift frame to bring the corresponding magazine into operative position, said pneumatic means being restored to neutral after each such shift frame movement.

39. In a typographical machine, the combination of a plurality of superposed matrix magazines shiftable fore and aft as a unit, driving mechanism for operating the machine proper in one direction, separate driving mechanism including a reversible motor and operable wholly independently of the machine driving mechanism for shifting the magazine unit in either direction, and control means for said motor drive including a magazine selecting element movable to render the drive operative to shift said unit different extents in either direction according to the extent and direction of movement of said selecting element.

40. In a typographical machine, the combination of a plurality of superposed matrix magazines shiftable fore and aft as a unit, driving mechanism for the machine proper, a reversible power drive distinct from the machine drive and in constant coupled relation with the magazine unit for shifting the latter in both directions, and control means including a magazine selecting element adapted upon changing the set position thereof to render the power drive operative to shift the magazine unit different extents according to the amount of change in the set position of said selecting element.

41. In a typographical machine, the combination of at least three superposed matrix magazines shiftable as a unit in opposite directions, a reversible power drive for shifting said unit in either direction to present any selected magazine therein in operative position, magazine selecting means movable from any one to any other of a series of different positions corresponding respectively to the positions of the magazines in the shiftable unit, and control means governing the operation of the power drive and the direction and extent of shifting movement thereby of said unit in accordance with the direction and extent of movement of the selecting means.

42. In a typographical machine, the combination of at least three superposed matrix magazines shiftable as a unit in opposite directions, a reversible power drive for shifting said unit in either direction to present any selected magazine therein in operative position, and control means governing the operation of the power drive including a magazine selecting lever movable from one to another of a series of positions each designating a different magazine in the shiftable unit and operative upon changing the position of the lever to permit operation of the power drive until the selected magazine arrives in operative position.

43. In a typographical machine, the combination of at least three superposed matrix magazines shiftable as a unit in opposite directions to present any selected magazine in operative position, a reversible power drive for shifting said unit in either direction, magazine selecting means movable from one to another of a series of different positions each designating a different magazine in the shiftable unit and adapted upon such movement to render the power drive operative, and means cooperative with said selecting means at each position thereof for automatically rendering the drive inoperative upon arrival of the selected magazine in operative position.

44. In a typographical machine, the combination of a plurality of superposed matrix magazines shiftable as a unit in opposite directions, a reversible power drive for shifting said unit in either direction to bring any selected magazine into operative position, and control means governing the operation of said drive, said means including a magazine selecting element movable different extents in either of two directions according to the position in the shiftable unit of a selected magazine relative to a magazine in use, and the direction and extent of such movement of the selecting element governing the direction and extent of shifting movement of the magazine unit required to bring the selected magazine into operative position.

45. In a typographical machine having driving mechanism for the machine proper, the combination of a plurality of superposed matrix magazines shiftable as a unit in opposite directions, a reversible motor drive distinct from and operable independently of the machine drive for shifting said unit in either direction to bring a selected magazine into operative position, magazine selecting means movable to determine the direction and extent of shifting movement, and control means adapted to initiate operation of the motor in response to movements of the selecting means and to cooperate with the selecting means to render the motor inoperative automatically upon arrival of said selected magazine in operative position.

46. In a typographical machine, the combination of a plurality of superposed matrix magazines shiftable fore and aft as a unit, power driven mechanism adapted to run continuously in one direction for operating the machine proper, and separate reversible power driven mechanism for shifting the magazine unit in either direction, said latter mechanism including a reversible motor in constant operative connection therewith, control means including a magazine selecting element for rendering the motor operative to effect a shifting movement of the magazine unit in a desired direction, and means operative automatically to stop the motor upon completion of such shifting movement.

47. In a typographical machine, the combination of a plurality of superposed matrix magazines shiftable fore and aft as a unit to present any selected magazine in operative position, driving mechanism for the machine proper, a reversible power drive operable independently thereof for shifting the magazine unit in either direction, and control means for said power drive, said means including a magazine selecting element having a series of positions corresponding to the different magazines and adapted upon a change of position to govern the starting and stopping of the power drive and to determine the extent of movement thereby of the magazine unit required to shift a selected magazine into operative position.

48. In a typographical composing machine, the combination of a series of three or more superposed magazines movable as a unit in opposite directions to bring different selected ones thereof into operative position, a reversible power drive for effecting such movement of the magazine unit, and control means governing the operation of the power drive and including a magazine selecting element having a series of positions corresponding to the different magazine selecting positions of the shift frame and shiftable from one position to another in selecting a given magazine for use, said power drive having a neutral setting for each different position of the magazine selecting element.

49. In a typographical composing machine, the combination of a series of three or more superposed magazines movable as a unit in opposite directions to bring different selected ones thereof into operative position, a reversible power drive for effecting such movement of the magazine unit, a magazine selecting element having a series of positions corresponding to the different magazine selecting positions of the shift frame and shiftable from one position to another in selecting a given magazine for use, means to initiate the operation of the power drive as the selecting element is shifted from any position, and means operating automatically to render the power drive inoperative upon the arrival of the selected magazine in operative position as determined by the new position of the selecting element.

50. In a typographical machine, the combination of a plurality of superposed matrix magazines shiftable fore and aft as a unit, driving mechanism for the machine proper, and driving mechanism including a reversible source of power all distinct from and operable wholly independent of the machine drive for shifting the magazine unit in either direction.

51. In a typographical machine, the combination of a plurality of superposed matrix magazines shiftable fore and aft as a unit, driving mechanism for the machine proper, and a separate reversible drive including a constantly connected source of power and operable as a whole independent of the machine drive for effecting shifting movement of the magazine unit in either direction.

52. A combination according to claim 49, as as an additional element, an automatic brake operative to brake the movement of the magazine unit as any selected magazine approaches its operative position.

53. In a typographical machine, the combination of a plurality of matrix magazines movable as a unit in opposite directions to bring different selected ones into operative position, a reversible power drive for effecting such movement of the magazine unit, brake mechanism operative automatically to brake the movement of the magazine unit as it approaches its different magazine selecting positions, and means for disconnecting the power drive upon the arrival of the magazine unit in any one of its different magazine selecting positions.

54. In a typographical machine, the combination of a plurality of matrix magazines movable as a unit in opposite directions to bring different selected ones into operative position, a reversible power drive for effecting such movement of the magazine unit, brake mechanism controlled from the magazine unit and operative automatically to brake the movement thereof as said unit approaches its different magazine selecting positions, and means for disconnecting the power drive upon the arrival of the magazine unit in any one of its different magazine selecting positions.

55. In a typographical machine, the combination of a plurality of magazines shiftable fore and aft as a unit, mechanism operable to impart shifting movement to said unit to bring a selected magazine into operating position, and brake means adapted for actuation by said unit and operative upon arrival of the selected magazine in such position automatically to brake the shifting movement imparted thereby to said unit.

56. In a typographical machine, the combination of a plurality of magazines shiftable fore and aft as a unit, mechanism operable to shift said unit to bring a selected one of the magazines into operating position, brake means operative automatically upon arrival of the selected magazine in such position to brake the shifting movement, and means controlled by the magazine unit for governing the operation of said brake means.

57. In a typographical machine, the combination of a plurality of magazines shiftable fore and aft as a unit, mechanism operable to shift said unit to bring a selected one of the magazines into operating position, brake means operative automatically upon arrival of the selected magazine in such position to brake the shifting movement, and means controlled by the magazine unit for governing the operation of said brake means and operative to effect both the application and release of the brake.

58. In a typographical machine, the combination of a plurality of magazines shiftable fore and aft as a unit, mechanism for shifting said unit to bring a selected one of the magazines into operating position, brake means adapted to brake the shifting movement at as many points as there are magazines in the unit thereof, and brake actuating devices for effecting application of the brake automatically at each of said points, said devices being operated through a common element cooperative with each of the magazines.

59. In a typographical machine, the combination of a plurality of magazines shiftable as a unit in opposite directions, reversible power driven mechanism for shifting said unit to bring any selected magazine into operating position, manually adjustable control means adapted upon adjustment to initiate the operation of said mechanism and to terminate such operation automatically upon arrival of the selected magazine in its operating position, and brake means operative automatically to brake the shifting movement of said unit upon termination of the operation of said power driven mechanism.

60. A combination according to claim 59, wherein the brake means includes devices arranged for actuation by the magazine unit substantially upon completion of the extent of shift permitted by the adjustable control means.

61. In a typographical machine, the combination of a plurality of magazines shiftable as a unit in opposite directions, reversible power driven mechanism for shifting said unit different extents as required to select one or another magazine for use, adjustable magazine selecting means operative upon adjustment to initiate the operation of said mechanism and to terminate such operation as required, and brake means including devices adapted automatically to effect application of the brake to brake the shifting movement upon termination of the operation of said power driven mechanism and to effect subsequent release of the brake.

JAMES C. PLASTARAS.